(12) United States Patent
Venkata et al.

(10) Patent No.: US 9,069,474 B2
(45) Date of Patent: Jun. 30, 2015

(54) RETENTION BASED DEFECTING IN A HYBRID MEMORY SYSTEM

(71) Applicant: Seagate Technology LLC, Cupertino, CA (US)

(72) Inventors: Sumanth Jannyavula Venkata, Shakopee, MN (US); Young-Pil Kim, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 126 days.

(21) Appl. No.: 13/971,781

(22) Filed: Aug. 20, 2013

(65) Prior Publication Data

US 2015/0058683 A1 Feb. 26, 2015

(51) Int. Cl.
*G06F 11/00* (2006.01)
*G06F 3/06* (2006.01)
*G06F 12/02* (2006.01)
*G06F 11/07* (2006.01)
*G06F 1/32* (2006.01)

(52) U.S. Cl.
CPC .......... *G06F 3/0619* (2013.01); *G06F 12/0253* (2013.01); *G06F 11/073* (2013.01); *G06F 3/0658* (2013.01); *G06F 3/068* (2013.01); *G06F 2212/702* (2013.01); *G06F 1/3228* (2013.01); *G06F 12/0246* (2013.01); *G06F 2212/7205* (2013.01)

(58) Field of Classification Search
CPC ..................... G06F 12/0246; G06F 2212/7205; G06F 12/0253; G06F 1/3228
See application file for complete search history.

(56) References Cited

U.S. PATENT DOCUMENTS

| 5,485,613 | A | * | 1/1996 | Engelstad et al. ..................... 1/1 |
| 6,339,811 | B1 | | 1/2002 | Gaertner et al. |
| 7,613,876 | B2 | | 11/2009 | Bruce et al. |
| 7,979,631 | B2 | | 7/2011 | Ahn et al. |
| 8,015,360 | B2 | | 9/2011 | Hong et al. |
| 8,032,700 | B2 | | 10/2011 | Bruce et al. |
| 8,180,964 | B1 | | 5/2012 | Koh et al. |
| 8,341,339 | B1 | | 12/2012 | Boyle et al. |
| 2006/0248387 | A1 | | 11/2006 | Nicholson et al. |
| 2008/0059694 | A1 | | 3/2008 | Lee |
| 2009/0319720 | A1 | * | 12/2009 | Stefanus et al. .............. 711/103 |
| 2010/0023672 | A1 | * | 1/2010 | Gorobets et al. .............. 711/103 |
| 2011/0093654 | A1 | * | 4/2011 | Roberts et al. ................. 711/105 |
| 2012/0124273 | A1 | * | 5/2012 | Goss et al. ..................... 711/103 |

(Continued)

FOREIGN PATENT DOCUMENTS

EP 1890236 2/2008

OTHER PUBLICATIONS

U.S. Appl. No. 13/542,990, filed Jul. 6, 2012, Sawin et al.

(Continued)

*Primary Examiner* — Charles Ehne
(74) *Attorney, Agent, or Firm* — Hollingsworth Davis, LLC (57) ABSTRACT

A first page in a memory unit is programmed with one or more pages of the secondary memory. A first time corresponding to the start of the programming of the first page is recorded. A second time corresponding to the completion of the programming of the one or more pages is recorded. A time difference between the first time and the second time is determined. It is determined if the time difference is greater than a threshold. In response to the time difference being greater than the threshold, a retention based defecting process is for the memory unit is disabled.

20 Claims, 5 Drawing Sheets

(56) References Cited

U.S. PATENT DOCUMENTS

2012/0210041 A1    8/2012    Flynn et al.
2012/0311237 A1    12/2012    Park
2013/0007343 A1*    1/2013    Rub et al. ................ 711/103

OTHER PUBLICATIONS

U.S. Appl. No. 13/543,036, filed Jul. 6, 2012, Sawin et al.
U.S. Appl. No. 13/543,079, filed Jul. 6, 2012, Venkata et al.
U.S. Appl. No. 13/543,100, filed Jul. 6, 2012, Venkata et al.
U.S. Appl. No. 13/543,123, filed Jul. 6, 2012, Sawin et al.
U.S. Appl. No. 13/543,303, filed Jul. 6, 2012, Venkata et al.
Hallnor et al., "A Fully Associative Software-Managed Cache Design", ISCA '00 Proceedings of the $27^{th}$ Annual International Symposium on Computer Architecture, 2000, pp. 107-116.
Ahmadi et al., "A Cache Architecture for Counting Bloom Filters", $15^{th}$ IEEE International Conference on Networks, 2007, pp. 218-223.

\* cited by examiner

RETENTION BASED DEFECTING IN A HYBRID MEMORY SYSTEM

SUMMARY

Some embodiments involve a method of operating a hybrid memory system that includes a primary memory and a secondary memory. A first page in a memory unit is programmed with one or more pages of the secondary memory. A first time corresponding to the start of the programming of the first page is recorded. A second time corresponding to the completion of the programming of the one or more pages is recorded. A time difference between the first time and the second time is determined. It is determined if the time difference is greater than a threshold. In response to the time difference being greater than the threshold, a retention based defecting process is for the memory unit is disabled.

According to some embodiments, a memory device includes a hybrid controller configured to manage data transfers between a host processor and a secondary memory. The secondary memory is configured to serve as a cache for a primary memory. The hybrid controller is configured to program a first page in a memory unit with one or more pages of the secondary memory; record a first time corresponding to the start of the programming of the first page in the GCU; record a second time corresponding to the completion of the programming of the one or more pages; determine a time difference between the first time and the second time; determine if the time difference is greater than a threshold; and in response to the time difference being greater than the threshold, disable a retention based defecting process.

Some embodiments involve a controller system for a hybrid memory system. The controller comprises a hybrid controller configured data transfers between the host processor and a flash memory. The flash memory is configured to serve as a cache for a magnetic disk. The hybrid controller is configured to program a first page in a memory unit with one or more pages of the secondary memory; record a first time corresponding to the start of the programming of the first page in the GCU; record a second time corresponding to the completion of the programming of the one or more pages; determine a time difference between the first time and the second time; determine if the time difference is greater than a threshold; and in response to the time difference being greater than the threshold, disable a retention based defecting process.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that operates as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory" and "secondary memory" are used herein for identification of components used in a hybrid memory system and to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Embodiments described herein relate to systems and methods for managing a retention based defecting process for a hybrid memory system. A hybrid system may continue to use a memory unit if a read fails. There may be less concern for losing the data in the cache because a second copy of the data is stored on the primary memory, i.e., the magnetic disk. It may be beneficial to be able to disable a defecting process to preserve capacity in a hybrid memory system.

Figure 1A:
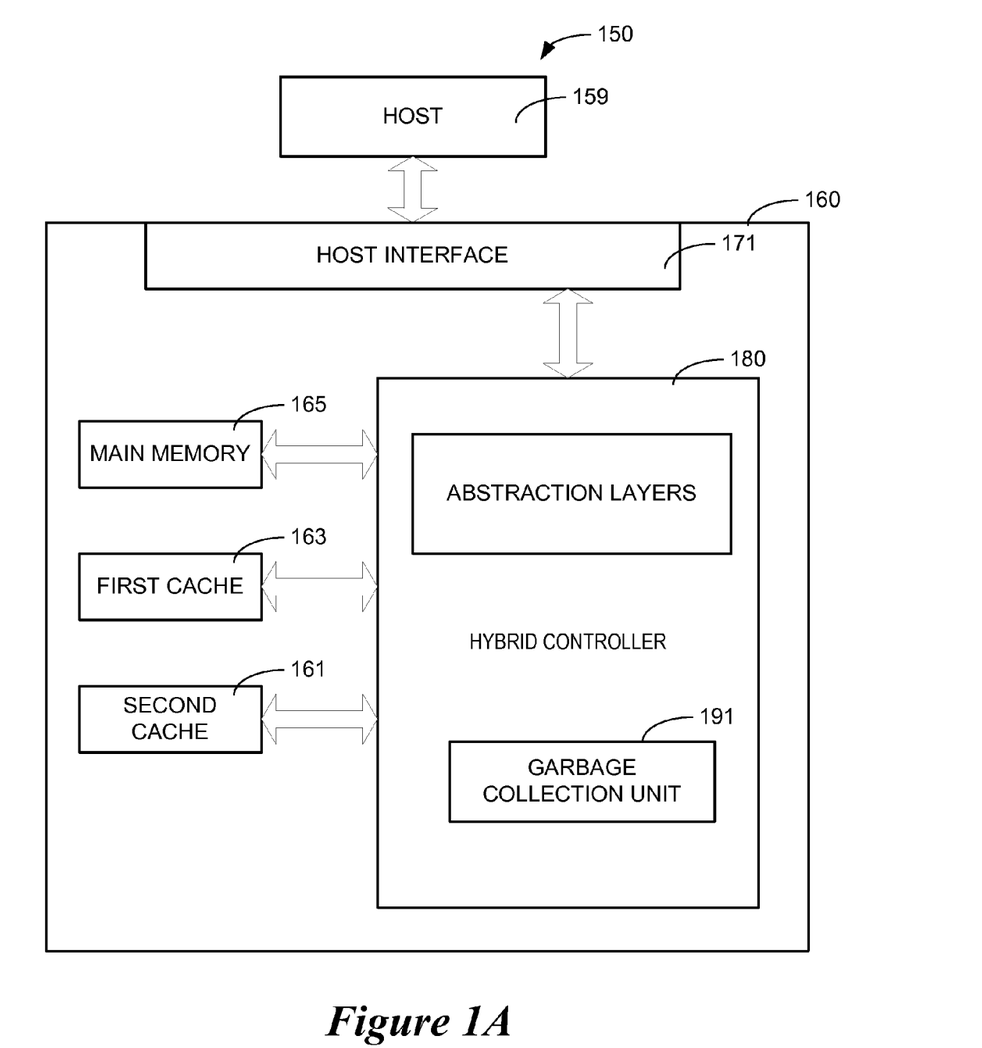
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data transferred to or from the host 159 to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests received from the host 159 are managed by the hybrid controller 180 to cause data to be written to and/or read from the hybrid drive with optimal efficiency. The second cache 161 in this example may optionally be a type of read cache referred to as read-only, in that only data marked for read operations by the host 159 are placed in the second cache 161. In such a configuration, data marked for writing to the main memory 165 are sent to the main storage 165, either directly or via the first cache 163.

The controller 180 controls data flow between the host interface 171 and the various memories 161, 163, 165 of the hybrid drive 160. The controller 180 also includes modules for maintaining memory functionality including a garbage collection unit 191 for coordinating garbage collection processes.

According to some embodiments, the hybrid memory device 160 (also denoted hybrid drive) may be implemented using a controller 180 configured as a hierarchy of abstraction layers. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, and may be faster and smaller than the main storage 165. The cache 163 is a primary cache, and may be faster and smaller than the secondary cache 161. For example, current read/write requests from the host 159 may be processed first via the primary cache 163 (e.g., identified by the data's logical block address). This enables host commands to complete quickly should the requested data be stored in the primary cache 163. For host read requests, if there is a miss in the primary cache 163 i.e., the requested data is not present in the primary cache, the requested data may be searched for in the secondary cache 161. If not found in either, requested data may be accessed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
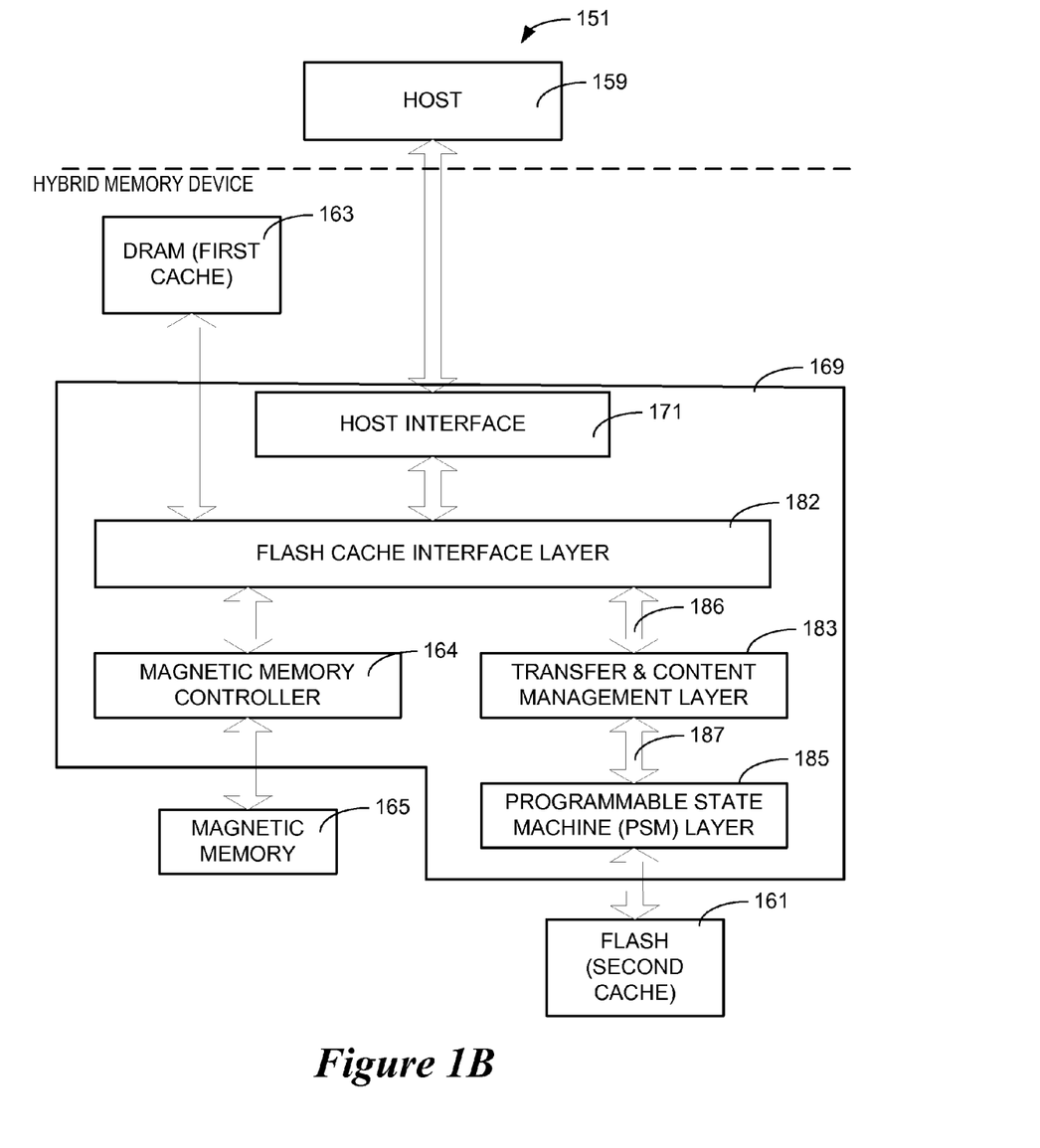
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, and may be faster but smaller than the main memory 165. The DRAM 163 serves as the first cache, and may be faster but smaller than the flash cache 161. While there is some processing and data transfer overhead in using the one or more caches 163, 161, the faster storage media used by the caches can enhance overall performance of the apparatus hybrid memory device.

The host 159 sends memory access requests to the hybrid memory device, for example, the host 159 may request that data be written to and/or read from the hybrid memory device. The host interface 171 is configured to transfer memory access requests from the host 159 to other components of the hybrid memory device and to transfer data between the host 159 and the hybrid memory device.

The hybrid controller 169 illustrated in FIG. 1B includes number of layers 182, 183, 185 wherein each layer communicates to its nearest neighboring layer(s), e.g., through a set of requests. For example, each layer 182, 183, 185 may only communicate to its nearest neighboring layer(s) without communicating to other layers. As an example, the layer 182 may only communicate directly to layer 183 and the host interface 171, without communicating directly with the layer 185 or to the flash 161. As an operation, such as a memory access request from the host 159, is being carried out, each layer 182, 183, 185 is configured to pass control to the next lower layer as the operation is implemented.

The example illustrated in FIG. 1B includes three layers 182, 183, 185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; and the programmable state machine (PSM) layer 185. Requests and/or data may be passed between the layers as indicated by arrows 186, 187 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161 The layered structure used in conjunction with the flash cache 161 can be configured to achieve specified rates and response times for servicing memory access requests.

The FCI layer 182 decides whether a host read request should be serviced from the primary magnetic memory 165 or from one of the caches 163, 161. The FCI layer 182 implements processes to determine which data should be promoted to the flash secondary cache 161 and/or the primary cache 163 based on various criteria to achieve optimal workload for the hybrid memory device. The flash content and transfer management (FCTM) layer 183 maintains a mapping, e.g., a fully associative mapping as discussed below, of the host LBAs to a memory space corresponding to the flash memory space arranged in clusters. The FCTM layer 183 interacts with programmable state machine (PSM) layer 185 and performs tasks such as optimal scheduling of promotion requests among dies of the flash (referred to as die scheduling), wear leveling, garbage collection and so forth.). The PSM layer programs hardware controllers to generate the required signals to read from and write to the flash 161, for example.

In some cases, one or more of the layers 182, 183, 185 of the hybrid controller 169 may be implemented by circuitry and/or by one or more processors, e.g., such as reduced instruction set computer (RISC) processors available from ARM. In some cases each layer 182, 183, 185 may be implemented by a separate processor. The processes discussed herein are implementable in hardware (interconnected electronic components that carry out logic operations) and/or by a processor implementing software instructions, e.g., stored in a computer readable medium, and/or by any combination of hardware and software.

Figure 2:
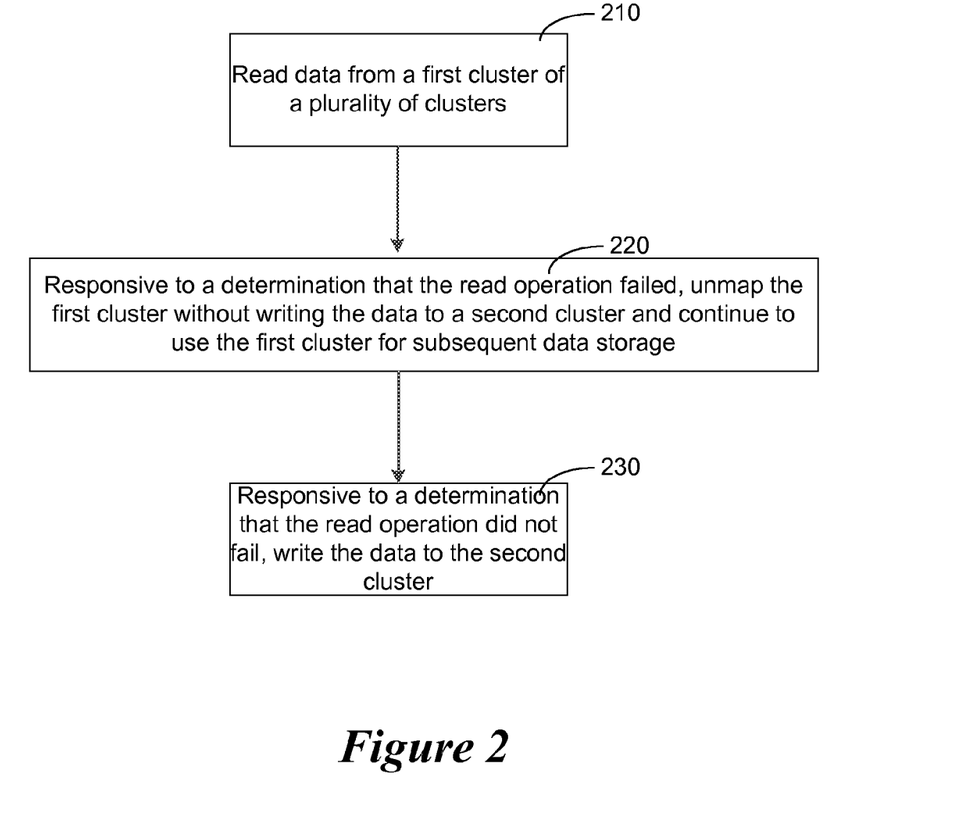
FIG. 2 is a flow diagram that illustrates a method for garbage collection in a hybrid system according to some embodiments.

In some implementations, the hybrid drive includes a flash cache (e.g. as a secondary cache) that undergoes garbage collection to make room for incoming data. The hybrid controller is configured to carry out garbage collection operations for the flash cache. The hybrid controller is configured to carry out garbage collection operations for the flash cache. FIG. 2 is a flow diagram that illustrates a method for garbage collection in a hybrid system according to some embodiments. In this example, the GCUs are made up of several data clusters. Consider the scenario where a first plurality of clusters of a first GCU are being garbage collected to a second plurality of clusters of a second GCU. Data is read 210 from a cluster of the first plurality of clusters of the first GCU. Responsive to a determination that the read operation failed 215, the cluster is unmapped 220 without writing the data of the cluster to a cluster of the second GCU. The cluster that experienced the read operation failure continues to be used for subsequent data storage. In a system that does not have a cache, the cluster that experienced the read operation failure may be defected (placed on a list of clusters that are not used because of defects) if a read operation fails. This is because in a system without a cache, there is no redundant copy of the data, thus clusters that have experienced one or a small number of read failures are defected so that the storage is robust. According to various aspects of the present disclosure, the hybrid system continues to use a cluster even if a read fails. In the hybrid configurations disclosed herein there may be less concern for losing the data in the cache because a second redundant copy of the data is stored on the primary memory, i.e., the magnetic disk. Responsive to a determination that the read operation did not fail 215, data from the cluster is written 220 to cluster of the second GCU.

As described above, a read error may not result in defecting of a block because a redundant copy of data is stored in the primary memory. In some cases, a read error may be remedied in response to a block being programmed and used again. The chance of the read error being remedied depends on a number of factors such as the relaxation time, the number of program/erase cycles experienced by the memory unit, temperature, among others. Defecting a memory unit due to a read error may result in unnecessary loss of capacity, particularly when the read error results from a transitory condition that can be remedied. It may be beneficial to be able to disable a defecting process to preserve capacity, particularly when redundant data is available.

Figure 3:
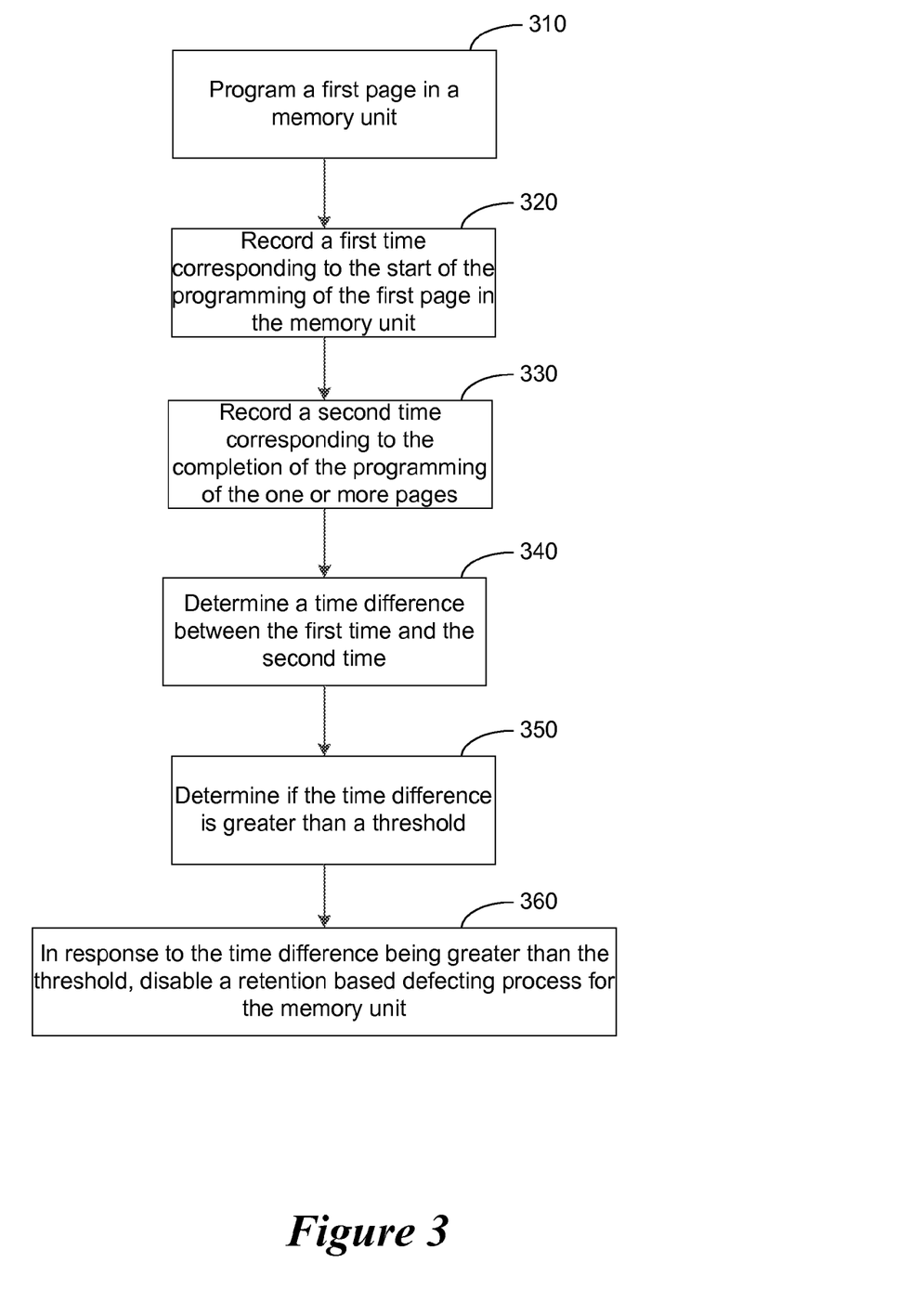
FIG. 3 illustrates a process for disabling a defecting process in accordance with various aspects.

FIG. 3 illustrates a process for disabling a defecting process. A first page in a memory unit is programmed 310. A first time ($t_1$) is recorded 320. The first time corresponds to the start of the programming of the first page in the memory unit. According to various implementations, the memory unit corresponds to a garbage collection unit (GCU). A second time ($t_2$) is recorded 330 that corresponds to the completion of the programming of one or more pages. A time difference ($\Delta t = t_2 - t_1$) is determined 340 between the first time and the second time. It is determined 350 whether the time difference is greater than a threshold. The threshold may be dependent on various factors. For example, the threshold may be a function of the retention time of the data stored in the memory unit. For example, the threshold may be higher if the retention time of the data stored in the memory unit is approaching the retention time indicated in the product specification, e.g. 3 days or months. According to various implementations, the threshold is in between 50% of the retention time recorded in the product specification (t_retention_spec) and the t_retention_spec such that 50% of t_retention_spec<$\Delta t$<t_retention_spec, for example. According to various implementations, the threshold is 80% of t_retention_spec.

In some implementations, the threshold may be a function of more than one factor. For example, the threshold may be a function of one or more of the retention time, the number of program/erase cycles experienced by the memory unit, the temperature of the memory unit, and/or the history of the temperature of the memory unit.

In response to the time difference being greater than the threshold, a retention based defecting process is disabled 360 for the memory unit. A larger time difference may indicate that the memory unit has a large relaxation time. A relaxation time is the time duration between two sequential program or erase events of the same memory unit. A larger relaxation time may indicate that the memory unit has less damage than other memory units and/or had more chance to recover accumulated damages generated at previous program/erase events. According to various aspects, the time difference being greater than the threshold indicates that the chance for the memory unit to have a read failure is low.

In some implementations, the threshold may be a function of more than one factor. For example, the threshold may be a function of one or more of the retention time, the number of program/erase cycles experienced by the memory unit, and/or the temperature of the memory unit. If the threshold is a function of more than one factor, a similar process may be used to the process shown in FIG. 3 for each of the factors. Alternatively, weighting coefficients can be applied to the factors, the weighted factors can be combined and compared to a composite threshold.

In some cases, the process of determining whether to disable a defecting process if the time difference is greater than a threshold (see blocks 350 and 360) may be checked periodically. Alternatively or additionally disabling the defecting process may be performed in response to a read error in the memory unit, for example. In some cases, the process of FIG. 3 is carried out in conjunction with a garbage collection operation.

In the event that the time difference is less than the threshold, the memory unit may be defected because the chance of a read error occurring is high, for example. In some cases, if the time difference is less than the threshold and a read error occurs, a counter is incremented. If the value in the counter rises above a threshold, e.g. 2 or 4, the memory unit may be defected during the next garbage collection process, for example.

Figure 4:
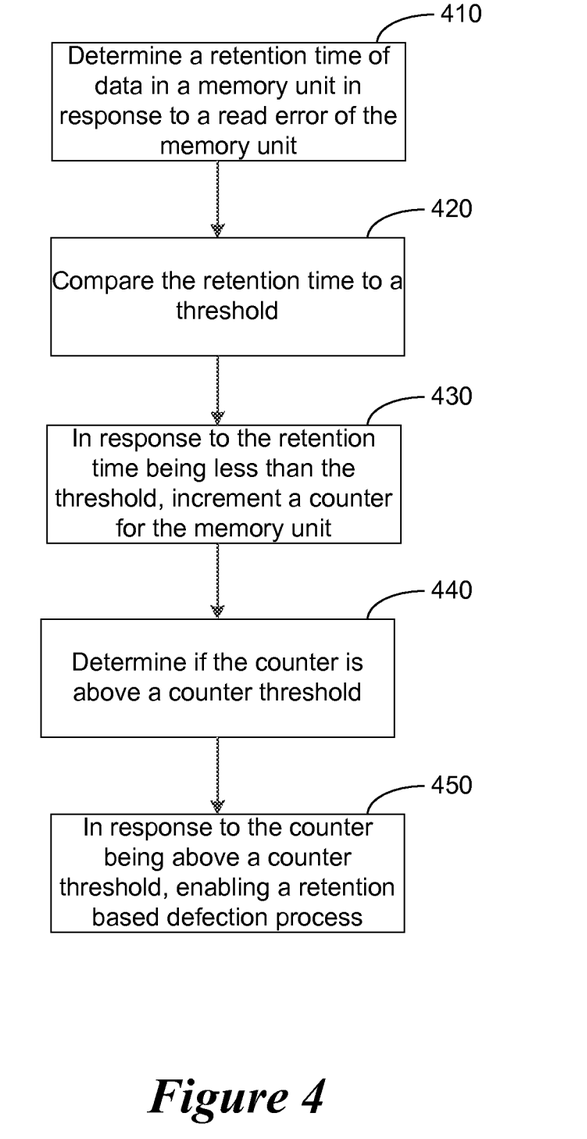
FIG. 4 shows a process for utilizing a counter to enable or disable a defecting process according to some implementations.

FIG. 4 shows a process for utilizing a counter to enable or disable a defecting process. A retention time of data in a memory unit is determined 410 in response to a read error. The retention time of the memory unit is compared 420 to a threshold.

In response to the retention time being less than the threshold, a counter for the memory unit is incremented 430. It is determined 440 whether the counter is above a counter threshold. In response to the counter being above the counter threshold, a retention based defecting process is enabled 450. The retention based defecting process is disabled while the counter is below a threshold.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A method of operating a hybrid memory system that includes a primary memory and a secondary memory, the method comprising:

programming a first page in a memory unit with one or more pages of the secondary memory;

recording a first time corresponding to the start of the programming of the first page;

recording a second time corresponding to the completion of the programming of the one or more pages;

determining a time difference between the first time and the second time;

determining if the time difference is greater than a threshold;

in response to the time difference being greater than the threshold, disabling a retention based defecting process for the memory unit.

2. The method of claim 1, wherein the memory unit is a garbage collection unit.

3. The method of claim 1, wherein the retention based defecting process is enabled if an unrecoverable read error occurs and is not enabled if the time difference being greater than the threshold.

4. The method of claim 1 comprising, in response to the time difference being less than the threshold enabling a retention based defecting process.

5. The method of claim 1, wherein disabling a retention based defect process comprises continuing to use the memory unit for subsequent data storage in the event of an unrecoverable read error.

6. The method of claim 1, further comprising:
determining one or more characteristics of the memory unit; and
disabling a retention based defecting process based on the one or more characteristics.

7. The method of claim 6 wherein the one or more characteristics comprise on or more of the number of program/erase cycles experienced by the memory unit and the temperature of the memory unit.

8. The method of claim 1, further comprising, in response to the time difference being less than the threshold and a detection of an unrecoverable read error, increasing a counter value for the memory unit.

9. The method of claim 8 further comprising:
determining if the counter value for the memory unit is above a threshold; and
in response to the counter value for the memory unit being above a threshold, defecting the memory unit.

10. A device, comprising:
a hybrid controller configured to manage data transfers between a host processor and a secondary memory, the secondary memory configured to serve as a cache for a primary memory, the hybrid controller configured to:
program a first page in a memory unit with one or more pages of the secondary memory;
record a first time corresponding to the start of the programming of the first page in the GCU;
record a second time corresponding to the completion of the programming of the one or more pages;
determine a time difference between the first time and the second time;
determine if the time difference is greater than a threshold;
in response to the time difference being greater than the threshold, disable a retention based defecting process.

11. The device of claim 10, wherein the memory unit is a garbage collection unit.

12. The device of claim 10, wherein the hybrid controller is configured to enable the retention based defecting process if an unrecoverable read error occurs and to not enable the retention based defecting process if the time difference being greater than the threshold.

13. The device of claim 10 comprising, in response to the time difference being less than the threshold, the hybrid controller is configured to enable a retention based defecting process.

14. The device of claim 10, wherein the hybrid controller is configured to continue to use the memory unit for subsequent data storage in the event of an unrecoverable read error when the retention based defect process is disabled.

15. The device of claim 10, wherein the hybrid controller is further configured to in response to the time difference being less than the threshold and a detection of an unrecoverable read error, increasing a counter value for the memory unit.

16. The device of claim 15, wherein the hybrid controller is further configured to:
determine if the counter value for the memory unit is above a threshold; and
in response to the counter value for the memory unit being above a threshold, defect the memory unit.

17. The device of claim 10, wherein the hybrid controller is further configured to:
determine one or more characteristics of the memory unit; and
disable a retention based defecting process based on the one or more characteristics.

18. The device of claim 17 wherein the one or more characteristics comprise one or more of the number of program/erase cycles experienced by the memory unit and the temperature of the memory unit.

19. A controller system for a hybrid memory system, the controller comprising:
a hybrid controller configured data transfers between the host processor and a flash memory, the flash memory configured to serve as a cache for a magnetic disk, the hybrid controller configure to:
program a first page in a memory unit with one or more pages of the secondary memory;
record a first time corresponding to the start of the programming of the first page in the GCU;
record a second time corresponding to the completion of the programming of the one or more pages;
determine a time difference between the first time and the second time;
determine if the time difference is greater than a threshold;
in response to the time difference being greater than the threshold, disable a retention based defecting process.

20. The controller system of claim 19, wherein the memory unit is a garbage collection unit.

* * * * *